United States Patent [19]

Howard, Jr.

[11] 4,097,447

[45] Jun. 27, 1978

[54] HIGH TENSILE STRENGTH POLYETHYLENE/LOW-HYDRATION ALUMINA COMPOSITES

[75] Inventor: Edward George Howard, Jr., Hockessin, Del.

[73] Assignee: E. I. Du Pont de Nemours and Company, Wilmington, Del.

[21] Appl. No.: 783,453

[22] Filed: Mar. 31, 1977

[51] Int. Cl.$^2$ ............................................. C08K 3/10
[52] U.S. Cl. .............................. 260/42.14; 260/42.46; 260/42.53
[58] Field of Search ................ 260/42.53, 42.46, 42.14

[56] References Cited

U.S. PATENT DOCUMENTS

| | | | |
|---|---|---|---|
| 2,874,140 | 2/1959 | Kloepfer | 260/42.46 |
| 3,256,236 | 6/1966 | Herman | 260/42.53 |
| 3,297,466 | 1/1967 | Herman | 427/212 |
| 3,950,303 | 4/1976 | Lipscomb | 260/42.46 |

*Primary Examiner*—James H. Derrington

[57] ABSTRACT

Polyethylene/alumina composites which are prepared by polymerizing ethylene onto the surface of low-hydration alumina prepared by calcining alumina trihydrate at a temperature of at least about 300° C provide molded objects having significantly increased tensile strengths as compared with the corresponding composites based on uncalcined alumina trihydrate.

15 Claims, No Drawings

HIGH TENSILE STRENGTH POLYETHYLENE/LOW-HYDRATION ALUMINA COMPOSITES

BACKGROUND OF THE INVENTION (1) Field of the Invention

This invention relates to polyethylene/low-hydration alumina composites. More particularly, it relates to composites having high tensile strengths and consisting essentially of polyethylene and alumina having a low degree of hydration.

(2) Description of the Prior Art

U.S. Pat. No. 2,874,140 describes blends of polymers with metal oxides that have been pyrogenically produced by hydrolyzing a volatile metal compound at temperatures up to 300° C. The polymer can be polyethylene and the oxide can be alumina, although there is no example of this combination. In the only example involving polyethylene (Example 8), a blend containing 40 parts per hundred of silica gave a tensile strength of 127 kg/cm$^2$ (1800 psi).

British Patent 808,286, published February 4, 1959, discloses the blending of polyethylene with up to 30% by weight, based on the polyethylene, of a metal compound such as dehydrated alumina prepared by hydrolyzing aluminum chloride at 1000° C. A film (30% Al$_2$O$_3$) prepared in this manner had an unstretched tensile strength of 174 kg/cm$^2$ (2470 psi). It is also disclosed that the polymerization can be carried out in the presence of the filler.

In earlier filed copending application, Ser. No. 699,942, filed June 25, 1976, applicant discloses flame-retardant polyethylene composites containing about 25–90% activated alumina hydrate of the formula Al$_2$O$_3$.xH$_2$O, where x is about 1.5–3.0. It is stated that the temperature used to activate the trihydrate should not exceed about 200° C. The purpose of this limit is to retain the water of hydration necessary for flame retardance. The alumina hydrate contains interacted at its surface a catalytically active transition metal compound, and the polyethylene is formed by polymerization on this surface. Molded objects made from the composites are strong and tough, even at high filler contents. Specific polyethylene/alumina hydrate composites described in Ser. No. 699,942 contain from 57.8% to 82.8% alumina trihydrate (x = 2.5–3.0) and have tensile strengths of from 1506 psi to 3402 psi, the median value being 2434 psi.

SUMMARY OF THE INVENTION

The present invention is based on the discovery that the tensile strength of solid, particulate, polyethylene/alumina composites which comprise (a) about 10 to about 70% by weight of polyethylene having an inherent viscosity of at least about 2, and (b) about 30 to about 90% by weight of finely-divided alumina having interacted at its surface a catalytically-effective amount of catalytically-active, transition metal compound, in which the polyethylene is polymerized onto the surface of the alumina, can be significantly improved by using, as the alumina, a low-hydration alumina prepared by calcining alumina trihydrate having a weight-average equivalent spherical particle diameter of about 0.1 to less than about 50 μ at a temperature of at least about 300° C. The preferred composites of this invention are homogeneous and, in unoriented, compression molded form, have a tensile strength of at least about 4500 psi.

The composites of this invention are prepared by various methods involving (A) calcining alumina trihydrate having a weight-average equivalent spherical particle diameter of about 0.1 to less than about 50 μ by heating at a temperature of at least about 300° C, thereby forming finely-divided, low-hydration alumina;

(B) polymerizing ethylene onto the surface of the low-hydration alumina having interacted at its surrface a catalytically-effective amount of catalytically-active, transition metal compound until a composite containing about 10 to about 70% by weight of polyethylene having an inherent viscosity of at least about 2 is formed; and (C) isolating the resulting polyethylene/low-hydration alumina composite as a free-flowing powder.

DESCRIPTION OF THE PREFERRED EMBODIMENT

The products of the invention are polyethylene/low-hydration alumina composites containing at least about 30% by weight of low-hydration alumina formed by calcining alumina trihydrate at a temperature of at least about 300° C. Preferably the products contain at least about 40% low-hydration alumina, and most preferably about 45% low-hydration alumina.

Unoriented compression molded objects prepared from these composites generally have tensile strengths of at least about 4500 psi. The minimum value of 4500 psi is about 32% higher than the highest value for the alumina trihydrate composites of Ser. No. 699,942 and about 85% higher than the median value. The compression molded objects used to determine this tensile strength value are molded at 180° C at atmospheric pressure for 3 minutes, followed by 180° C and 3000 psi for 2 minutes.

When alumina trihydrate (Al$_2$O$_3$.3H$_2$O) is heated at atmospheric pressure, it begins to lose water of hydration at about 170° C and sufficient trihydrate is dehydrated to alumina monohydrate (Al$_2$O$_3$.H$_2$O) to provide an average composition of the formula Al$_2$O$_3$.2H$_2$O between about 170° C and about 240° C. The water content then drops sharply, the composition changing totally to the monohydrate between about 240° C and 250° C. At about this point water begins to be lost more slowly with increasing temperature, a degree of hydration of about 0.8H$_2$O being reached at about 270° C. In this region there is a rather pronounced break in the water content/temperature curve, the degree of hydration being about 0.7H$_2$O at 300° C and then dropping slowly until essentially completely dehydrated alumina is formed at about 700° C. See Newsome et al., Alumina Properties, Alcoa Research Laboratories, Technical Paper No. 10, Second Revision, 1960, Aluminum Company of America, Pittsburgh, Pa.

The significant increase in tensile strength of polyethylene/low-hydration alumina composites appears to correspond to the pronounced break in the water content/temperature curve described above. Although products having the improved tensile strength observed in accordance with this invention can sometimes be made from an alumina hydrate which was calcined at a temperature below 300° C, these results are not always reproducible. Calcination at about 300° C, or higher, almost always leads to a high-tensile product. Correspondingly, about 0.8 H$_2$O appears to be about the upper limit of hydration that will reproducibly result in a high-tensile product.

As noted above, the alumina hydrates resulting from the calcination are referred to herein as "low-hydration aluminas". For simplicity, the resulting composites are referred to as polyethylene/low-hydration alumina composites. It is hard to determine the water contents of these low-hydration aluminas accurately and reproducibly. For example, low-hydration aluminas ($Al_2O_3 \cdot xH_2O$) prepared by calcination of alumina trihydrate at 500° C and 600° C had degrees of hydration of $x = 0.21$ and 0.29, respectively. To furnish a standard basis of comparison in the examples, the low-hydration alumina contents of the product are reported as percent $Al_2O_3$. The actual low-hydration alumina contents will of course be slightly higher, to a degree corresponding to the degree of hydration of the alumina.

Above about 300° C, the calcination temperature is not critical. As shown in the examples, temperatures up to 900° C, and higher, can be used, but no advantage results, and the power requirements are great at these higher temperatures. For convenience, and to insure reasonable reproducibility of results, the preferred calcination temperature is between about 350° and about 500° C. Within broad limits, the time of calcination is likewise not critical. For convenience, and to insure dehydration to a given degree, the calcination is carried out for a period of about 12–18 hours. However, heating for only 10 minutes at 600° C can suffice. It is preferred, of course, to use relatively longer times at relatively lower temperatures.

Any alumina trihydrate having a weight-average equivalent spherical particle diameter of about 0.1 to less than about 50 $\mu$ is suitable for use in accordance with this invention. The term "equivalent spherical particle diameter" is used because the alumina trihydrate particles are not spherical in shape and thus do not have diameters as such. This term means that a given particle has a diameter equivalent to the diameter of a sphere having the same volume. If the particle diameter is smaller than about 0.1 $\mu$, then the advantageous physical properties of the molded objects of this invention may not be realized. If the particle diameter is larger than about 50 $\mu$, then the resulting formed objects will have excessively rough surfaces. Preferably the weight-average equivalent spherical particle diameter is less than about 25 $\mu$, and most preferably is about 0.5 to about 10 $\mu$.

The products of the invention are prepared by (1) calcining alumina trihydrate at a temperature of at least about 300° C and (2) polymerizing ethylene onto the surface of the resulting low-hydration alumina having interacted at its surface a catalytically-active transition metal compound. By "transition metal" is meant a metal of Group IVa, Va or VIa of the Periodic Table. These metals are titanium, zirconium, hafnium, vanadium, niobium, tantalum, chromium, molybdenum and tungsten. The Periodic Table referred to throughout this specification is that published in Advanced Inorganic Chemistry by Cotton and Wilkinson, third edition (1972), Interscience Publishers.

The transition metal components of coordination catalyst systems disclosed in the prior art as being suitable for ethylene polymerization are generally suitable for use in accordance with this invention. Preferably the transition metal compound, at the stage that it comes in contact with ethylene in the polymerizaton process, contains substantially no halogen bonded to the transition metal. The low-hydration alumina should contain sufficient transition metal compound to provide about 0.00001 to about 2.2 milligram-atom, per gram of low-hydration alumina, of transition metal, and preferably about 0.0001 to about 2.2 milligram-atom interacted at the surface of the low-hydration alumina.

The upper limit of about 2.2 milligram-atoms, per gram of low-hydration alumina, of transition metal interacted at the surface of the low-hydration alumina represents saturation of the monomolecular layer at the surface with transition metal in the closest possible packing configuration. Although more transition metal can be adsorbed as an added layer, no more than about 2.2 milligram-atoms of of transition metal can interact at the surface.

The processes used to prepare the composites of this invention optionally and preferably include as part of the coordination catalyst system a catalytically-active, organoaluminum compound selected from the group consisting of trialkylaluminums ($R^1R^2R^3Al$), dialkylaluminum hydrides ($R^1R^2AlH$), dialkylaluminum alkoxides ($R^1R^2AlOR^3$), alkylaluminum halides ($R^1R^2AlX$ and $R^1AlX_2$) and polymeric hydrocarbylaluminums in which the alkyl groups, alike or different, have 1 to about 10 carbons each. Suitable compounds include the commercially available trimethylaluminum, triethylaluminum, tri-n-propylaluminum, triisobutylaluminum, tri-n-hexylaluminum, tri-n-octylaluminum, tri-n-decylaluminum, diethylaluminum hydride, diisobutylaluminum hydride, diethylaluminum ethoxide, diisobutylaluminum ethoxide, and the like. Polymeric hydrocarbylaluminums such as aluminum-isoprene polymers are described in U.S. Pat. No. 3,149,136. The trialkylaluminums and dialkylaluminum hydrides are preferred. The alkylaluminum halides are not preferred since the final polymer is corrosive to metal in many applications. Preferably the composites of this invention are free to residual halogen and thus noncorrosive. The organoaluminum compound should be present in an amount which provides a mole ratio of organoaluminum compound to transition metal compound of about 1000:1 to about 4:1, and preferably about 40:1 to about 10:1.

The composites of this invention are preferably homogeneous, that is, essentially all of the polyethylene is polymerized onto the surface of the low-hydration alumina and essentially all of the low-hydration alumina has polyethylene polymerized onto its surface. By the term "essentially all" it is meant that the amount of alumina-free polymer and polymer-free alumina present is not sufficient to materially alter or detract from the basic and novel characteristics of composites containing none of these components. In other words, this term excludes alumina-free polymer and polymer-free alumina in amounts which prevent the advantages of this invention from being realized.

One approach to preparing the preferred homogeneous products of this invention involves pretreating the low-hydration alumina to provide about 0.00001 to about 2.2, and preferably about 0.0001 to about 2.2 milligram-atom, per gram of low-hydration alumina, of certain transition metals in the form of a catalytically-active, transition metal compound interacted at its surface, and isolating the transition metal compound-treated, low-hydration alumina from any transition metal compound not attached to the low-hydration alumina. The polymerization is then carried out by dispersing the pretreated low-hydration alumina in an inert, liquid hydrocarbon along with the organoaluminum compound and ethylene.

In accordance with this process, the low-hydration alumina is first contacted, for example, with a hydrolyzable titanium compound, the adsorbed titanium species is hydrolyzed, and the titanium-treated alumina is activated. Suitable hydrolyzable titanium compounds include titanium tetrachloride, tetraalkyl titanates and mixtures thereof wherein the alkyl groups, alike or different, have 1–6 carbon atoms. In the case of titanium tetrachloride, the low-hydration alumina can be exposed to titanium tetrachloride vapor until the surface is saturated. In the case of the titanate esters, the low-hydration alumina is milled with a solution of titanate ester. Since the titanium compound is adsorbed from the solution by the low-hydration alumina, the concentration of titanium in the solution may vary over wide limits provided the solution at least contains the minimum amount of titanium that is desired at the surface of the alumina. Suitable tetraalkyl titanates include tetramethyl titanate, tetraethyl titanate, tetrapropyl titanate, tetraisopropyl titanate, and the like. Contacting of the low-hydration alumina with, for example, a titanate ester is believed to result in bonding a titanium-containing group to the surface of the substrate alumina. The titanium-containing alumina is then freed of unadsorbed titanium compound by washing or by vaporization such as by sweeping with hot nitrogen.

The adsorbed titanium compound is then hydrolyzed to what is believed to be a derivative of titanic acid [Ti(OH)$_4$] chemically bound to the surface of the particle. When the titanium compound is titanium tetrachloride, this can be accomplished by contacting the titanium-treated alumina with aqueous or moist gaseous ammonia to ensure that all of the chlorine is removed. In the case of a titanate ester, hydrolysis of the titanium compound can be accomplished by exposing the titanium-treated filler to moist air.

The titanium-treated filler is then activated by heating at a temperature of at least about 300° C. Although the form of the titanium compound on the surface of the activated filler is not known with certainty, it is believed to be closely related to titania. Accordingly, the hydrolyzed and activated titanium-treated alumina is referred to herein as titania-modified, low-hydration alumina.

Another and a preferred approach to preparing the homogeneous composites of this invention involves the adsorption at the surface of the alumina in the polymerization medium of a hydrocarbon-soluble, organic, transition metal compound which is relatively more active as a catalyst when adsorbed at the surface of the alumina, for example at least about 50 times more active, than when in solution. Accordingly, this approach does not require removal of excess transition metal compound from the polymerization reaction medium. By "hydrocarbon-soluble" is meant an organic, transition metal compound which is soluble in at least one hydrocarbon solvent or can be solubilized in such solvent by the presence of an organoaluminum compound.

In accordance with this method, the polymerization is carried out by dispersing the low-hydration alumina in an inert, liquid hydrocarbon along with a hydrocarbon-soluble, organic, transition metal compound, and an organoaluminum compound. The hydrocarbon-soluble, organic, transition metal compounds used in this approach are of the formula $$L_nMX_p$$

wherein L is an organic ligand bonded to M by carbon, oxygen, or nitrogen; M is a transition metal; X is a non-organic ligand, preferably halogen; n is an integer from 1 to the highest valence of M; and p is an integer from 0 to 1 less than the highest valence of M. Suitable L groups include hydrocarbyl such as alkyl and alkenyl, substituted hydrocarbyl such as substituted alkyl and substituted alkenyl, hydrocarbyloxy, hydrocarboncarbonyloxy, hydrocarbylsilylhydrocarbyl, dihydrocarbylamino, β-diketonato, and the like.

Illustrative classes of suitable hydrocarbon-soluble, organic, transition metal compounds include tetrabenzylzirconium and related tetrabenzyl, tetrakis(substituted benzyl), and tetranaphthyl derivatives of titanium, zirconium, and hafnium disclosed by Long in U.S. Pat. Nos. 3,635,935, Pioli et al. in 3,681,317, and Candlin et al. in 3,738,944; tetrakis(trimethylsilylmethyl)zirconium and related compounds disclosed by Candlin et al. in 3,738,944; and tetraneophylchromium and the related tetrahydrocarbylchromiums disclosed by Kruse in 3,798,250.

A preferred class of hydrocarbon-soluble, organic, transition metal compounds are those in which some or all of the L groups are substituted alkyl groups of the formula $$-CH_2Y$$

in which Y represents an atom or group capable of interaction with the vacant d-orbitals of the metal M. Suitable Y groups include aromatic groups such as phenyl, naphthyl, substituted phenyl and substituted naphthyl groups, and groups of the formula $$M'(R)_3$$

in which M' is carbon or silicon, and R, alike or different, is hydrocarbyl such as alkyl or aryl.

Specific hydrocarbon-soluble, organic, transition metal compounds include tetrabenzylzirconium, tetrabenzyltitanium, tetrabenzylhafnium, tetraneophylzirconium, tetraneophylchromium, tetraneophyltitanium, tetrakis(p-isopropylbenzyl)titanium, tetratolyltitanium, tetrakis(tetraethylbenzyl)titanium, tetramethyltitanium, tetraneopentylzirconium, tetraneopentyltitanium, tetraneopentylhafnium, tetrakis(p-methylbenzyl)zirconium, tetrakis(1-naphthylmethyl)titanium, tetrakis(trimethylsilylmethyl)zirconium, tribenzylzirconium chloride, tris(π-allyl)zirconium bromide, tris(π-methallyl)titanium chloride, tetrakis(π-allyl)hafnium, tetrakis(π-allyl)chromium, tetrakis(π-allyl)niobium, chromium octoate, chromium naphthenate, tetrakis(2,4-pentanedionato)zirconium, tetrakis(2,4-pentanedionato)titanium, tetrakis(dimethylamino)titanium, tetrakis(diethylamino)vanadium, and the like. Preferably the organic transition metal compound contains no halogen bonded to metal.

The amount of hydrocarbon-soluble, organic, transition metal compound added to the polymerization reaction should be equivalent to about 0.0001 to about 1.0 milligram-atom of transition metal per gram of low-hydration alumina, and preferably about 0.001 to about 0.1 milligram-atom. This amount will provide low-hydration alumina having interacted at its surface sufficient organic transition metal compound to provide about 0.00001 to about 1.0 milligram-atom of transition metal per gram of low-hydration alumina, and preferably about 0.0001 to about 0.1 milligram-atom.

The preferred hydrocarbon-soluble, organic, transition metal compounds are the zirconium compounds. Preferably the polymerization reaction is carried out in the presence of an amount of zirconium compound equivalent to about 0.005 to about 0.05 milligram-atom of zirconium per gram of low-hydration alumina. This amount will provide alumina having interacted at its surface sufficient organic transition metal compound to provide about 0.001 to about 0.01 milligram atom of zirconium per gram of low-hydration alumina. The preferred zirconium compounds are the tetraorganozirconium compounds.

The most active of the hydrocarbon-soluble, organic, transition metal compounds are the zirconium compounds. In order to provide homogeneous composites using hydrocarbon-soluble, organic, zirconium compounds, it has been found that the initial contact for the alumina and the transition metal compound should not be between each other. This same rule is advantageously followed in the case of the less active transition metal compounds, with the possible exception of chromium compounds of low activity where satisfactory results are obtained by contacting the low-hydration alumina and the transition metal compound directly. Initial contact between the low-hydration alumina and the transition metal compound leads in most cases to a heterogeneous product and should be avoided.

In preparing homogeneous products by this approach, initial contact between the low-hydration alumina and the transition metal compound can be avoided by proceeding in one of two ways. In accordance with one method, the low-hydration alumina is first reacted with a large excess of the organoaluminum compound. The transition metal compound is then added. The mole ratio of organoaluminum compound to transition metal compound should preferably be in the range of about 1000:1 to about 4:1, and most preferably about 40:1 to about 10:1.

Although it is not intended that this invention be restricted to any particular theory, it is believed that this excess organoaluminum compound reacts with many of the hydroxyl groups on the surface of the alumina, thus limiting the reactive sites available to the transition metal compound. The transition metal compound now reacts uniformly with all of the alumina particles as it seeks the limited number of available sites.

In accordance with another and preferred method of avoiding initial contact between the low-hydration alumina and the transition metal compound, the transition metal compound is first reacted with a large excess of oganoaluminum compound in amounts which provide a mole ratio of organoaluminum compound to transition metal compound of about 1000:1 to about 4:1 thereby forming a complex. The dispersion of low-hydration alumina in the hydrocarbon diluent is then contacted with this complex.

Before the low-hydration alumina can be used in the polymerization reaction, it must first be freed of gaseous oxygen, water and other polar impurities that interfere with the polymerization reaction. This is readily accomplished by sweeping the filler with an inert gas such as nitrogen with heating.

The polymerization is carried out by dispersing the pretreated, low-hydration alumina in an inert, liquid hydrocarbon diluent. Preferably the low-hydration alumina is dispersed in the amount of at least about 1 weight/volume percent, and most preferably about 5 weight/volume percent. The term "weight/volume percent", as used throughout the specification and claims, refers to grams of solid added to 100 milliliters of liquid.

The slurry of the low-hydration alumina in the diluent can be quite viscous, especially in the case of high-solids slurries. Addition of the organoaluminum compound to these slurries with vigorous stirring dramatically reduces the viscosity. For example, the viscosity of a typical system might be reduced from about 5,000 centipoises to about 300 centipoises by the addition of an organoaluminum compound.

Suitable inert, liquid hydrocarbon diluents for use as the polymerization medium include aromatic, saturated aliphatic, and saturated alicyclic hydrocarbons. While the liquid cyclic and acyclic hydrocrabons of about 5–10 carbons such as pentane, hexane, heptane, octane, decane, cyclohexane, benzene, toluene, xylene and tetralin are preferred, the lower boiling propanes and butanes can also be used.

The diluent should be anhydrous and preferably is made so by passing it through highly absorptive alumina such as a Woelm acid alumina column immediately prior to use. The liquid diluents can also be freed of contaminants such as oxygen and water by treatment with traces, e.g., about 0.50%, based on the weight of diluent, of the organoaluminum compound to be used as a catalyst component in the polymerization. This, along with the acid alumina treatment, ensures maximum avoidance of moisture and other impurities.

The polymerization reaction can be carried out by adding ethylene at temperatures from about 0° to about 250° C. A polymerization temperature below that at which the diluent swells the polyolefin is preferred since swelling greatly increases the viscosity of the reaction mixture and makes agitation difficult or impossible unless low concentrations of materials are used. For practical reasons, polymerizations should be run at temperatures not in excess of about 100° C when pure alkanes or cycloalkanes are used. When a strong polyolefin solvent such as benzene, toluene, tetralin or xylene is used, even lower temperatures, such as about 60° C or below, should be used. Preferably temperatures of about 25° to about 100° C are used, and most preferably about 50° to about 90° C.

Polymerization is readily carried out at pressures from about atmospheric to about 500 atmospheres. Pressures in the lower range are generally preferred, and about 3–70 atmospheres are most satisfactory. The course of the polymerization reaction is followed by noting the change in weight of the supply vessel containing the ethylene. The supply vessel is normally used to maintain the pressure in the reaction vessel. Reaction times may vary over a wide range, for example, from a few seconds to about 24 hours.

When composites in which the molecular weight of the polyolefin is to be restricted, for example, to inherent viscosities below about 12, are prepared, the polymerization generally is carried out in the presence of hydrogen. In this case the hydrogen:ethylene partial pressure ratio is about 1:20 to about 20:1, and preferably about 1:5 to about 5:1. Preferably the total pressure is not in excess of about 500 psi.

A wide variety of additives can be readily blended with the polyethylene/low-hydration aumina composite without the necessity of melting the polymer. For example, the composites can be stabilized against ultraviolet and thermal oxidative exposure by the addition of conventional stabilizers and conventional antioxidants. Suitable ultraviolet light adsorbers include substituted benzophenones such as 2-hydroxy-4-n-heptyloxybenzophenone, benzotriazoles such as substituted hydroxybenzotriazoles, salicylates such as phenyl salicyclate, metal chelates such as "Cyasorb" UV 1084 and "Cyasorb" UV 2548, and carbon black.

Suitable antioxidants for addition to the composites of this invention include alkylated phenols and bis-phenols such as "Good-rite" 3114, a butylated hydroxytoluene; alkylidene bis-, tris-, and polyphenols such as "Irganox" 1010 and "Santowhite" powder; thio and dithio bis-, tris-, and polyalkylated phenols such as "Santonox"; phenol condensation products such as "Toponol" CA; amines such as "Carstab" 601; esters such as dilauryl thiodipropionate; and organic phosphites and phosphates such as tridodecyl phosphite and tris(nonylphenyl) phosphites. Fire retardants such as chlorinated polyethylene, zinc phosphates and tris(2,3-dibromopropyl) phosphate can also be added.

The composites of this invention can also be formulated with conventional organic and inorganic pigments to provide colored systems. Suitable pigments include quinacridone red, anthraquinone red, diarylide yellow-HR, bis-azo red, bis-azo orange, bis-azo yellow, isoindolinone orange, isoindolinone yellow, isoindolinone red, phthalocyanine blue, phthalocyanine green, carbon black, iron oxide, ultramarine blue, ultramarine green, pigmentary oxides such as pigmentary titania, zinc oxide and antimony trioxide, and the like. Preferably these pigments should have a weight-average effective spherical particle diameter less than that of the filler containing the active polymerization sites.

The composites of this invention are formed into useful articles by various forming techniques, some of which have been used heretofore with polyolefins and other resins, and others which have been used heretofore for metal forming but which have not been previously used for resins. These techniques generally involve subjecting the composite to a temperature at which the composite softens in the range of about 105° to about 250° C and a positive pressure of about 10 to about 100,000 psi or more. In general, temperatures of about 150° to about 225° C and pressures of about 10 to about 15,000 psi are preferred.

A useful means of forming articles from these polyethylene/low-hydration alumina composites is by compression molding, which involves the simultaneous application of heat and pressure. This operation can be carried out by filling a mold with the composite powder, and pressing the powder in the mold with application of heat sufficient to raise the temperature above the softening point of the composite. Temperatures of about 150° to about 225° C and positive pressures of about 10 to about 5000 psi, and preferably of at least about 1000 psi, are suitable. When the formed article has cooled below the melting point of the polymer, the mold is opened and the article is removed.

Sheets may be formed from these polyethylene/low-hydration alumina composites using suitable sheeting equipment by passing the composite along a continuous belt, subjecting the composite to a softening temperature in the range of about 150°–250° C while it passes through a restricted space which compresses the composite against the belt at a pressure of about 50–5000 psi without subjecting the composite to shearing forces, and removing the resulting sheet from the continuous belt after it passes through the restricted space. In one particular piece of equipment the composite is compressed between two continuous belts which, as they progress, move closer together thereby developing a pressure of about 1000–5000 psi.

Useful articles can be prepared from these sheets by suitable reforming techniques. For example, formed objects of a wide variety of shapes can be prepared by heating a piece of compression molded sheet to a temperature of about 105° to about 225° C and then pressing the hot sheet between a male die and a pad of elastomeric material such as a block of elastomeric material having a rigid backing or an elastomeric diaphragm backed by a hydraulic fluid. The hot sheet is allowed to cool as it is pressed between the die and the pad, and thus can be removed from the die almost immediately.

The composites of this invention can also be formed into films. These films may be obtained by stretching a sheet or film formed by any of the above compression molding techniques, such as the above sheeting techniques or pressing between platens and heating. The stretching can be carried out at temperatures from room temperature to temperatures above the melting point of the polyethylene. The sheet or film may be stretched either in one direction or in more than one direction either sequentially or simultaneously. Stretching by rolling the sheet or film under pressure results in a film which is stronger than the original and has a relatively lower void content than a similar film formed by pull-stretching. In this rolling technique, temperatures above or below the normal melting temperature of the polyethylene may be used.

Because of the particulate nature of the composites of this invention they are amenable to powder forming techniques which involve cold compressing in a mold followed by sintering. The powder is placed in a mold and compressed at a pressure of about 100 to about 100,000 psi, preferably at least about 1000 psi, and most preferably, at least about 5,000 psi, at a temperature below the melting point of the polyethylene to form self-supporting articles. The article is then removed from the mold and densified by heating at a temperature above the softening point of the composite, e.g., about 105° to about 225° C, to form the finished article.

The products of the invention are useful in a variety of applications, e.g., house sidings, wall panels, containers, dishes, instrument housings, insulators, and the like. Their high tensile strengths make them especially useful as support brackets where rigidity supplied by the high modulus is also important. Specific examples are handles on doors, drawers, and buckets.

The composites of this invention are also useful for coating a wide variety of substrates by conventional powder-coating techniques. In accordance with these techniques, for example, a substrate can be heated and then dipped into a fluidized bed of the composite powder. The powder will adhere to the hot substrate because of the adhesive character of the softened composite. The powder coating is then coalesced by sintering. This technique is useful for wire coating and the like.

Determination of Inherent Viscosity

The inherent viscosity of the polyethylene is measured by the following procedure except where otherwise noted: A sample of the composite powder calculated to contain 0.025 g of polyethylene is placed in a closed flask containing a magnetic stirring bar and adapted for insertion of a thermometer and a condenser containing a nitrogen purge tube. Into this flask is pipetted 50 ml of 1,2,4-trichlorobenzene containing 1.33 g/l of butylated hydroxytoluene antioxidant to give a 0.05 weight/volume percent solution of polyethylene.

With the thermometer and condenser in place, nitrogen is slowly passed over the contents of the flask, the magnetic stirrer is started, and the contents of the flask are heated to 180° C. The solution is stirred at this temperature for 2 hours. At the completion of this time, the condenser unit and the thermometer are removed from the flask. A ground glass stopper is inserted into the thermometer-well, a tube to support a capillary viscometer is inserted in the condenser-well, and the entire unit is transferred to an oil bath and maintained at 130° C. A capillary viscometer having three scratch marks, one near the bottom, one above the bulb and one below the bulb is inserted in the support tube.

After 1 hour at 130° C in the oil bath, the viscometer is adjusted so that the tip is immersed in the solution to the depth indicated by the bottom scratch. Vacuum is gently applied to the top of the viscometer until the solution has risen to a level above the top scratch on the viscometer. The vacuum is removed and the solution is allowed to fall. The flow of the solution between the scratch above the bulb and the scratch below the bulb is timed. This flow time measurement is repeated until three values which check within ± 0.3 second are obtained. The flow time of the pure solvent is also measured at 130° C in the same way.

The inherent viscosity is calculated using the following equations:

$$\text{Relative Viscosity} = \frac{\text{Time of solution flow}}{\text{Time of solvent flow}}$$

$$\text{Inherent Viscosity} = \frac{\text{natural log of relative viscosity}}{\text{w/v\% polymer concentration}}$$

The following examples illustrate the invention. In these examples triisobutylaluminum was used as a 1.0 M solution in heptane. Physical properties were determined by ASTM tests designated as follows:

| Property | Test Specifications |
|---|---|
| Tensile strength, maximum (T) | ASTM-D-638-71A |
| Elongation at break ($E_b$) | ASTM D-638-71-A |
| Modulus in tension, initial ($M_i$) | ASTM D-638-71A |
| Izod impact strength | ASTM D-256-72A |
| Heat deflection temperature (HDT) | ASTM D-648-56 |

In the tensile, elongation and modulus tests, test bars of Type I and Type V of ASTM test method 638-72 were used. Compression molding was carried out at 180° C at atmospheric pressure for 3 minutes, followed by 180° C and 3000 psi for 2 minutes.

EXAMPLE 1

Up to the start of the polymerization, all operations were carried out under nitrogen. This example uses Great Lakes Foundry Sand Company's "GHA" 332 alumina trihydrate which has a weight-average equivalent spherical particle diameter of 4 $\mu$. The alumina trihydrate (78 g) was calcined by heating at 500° C for 18 hours in a stream of nitrogen at 30 liters/hr and then cooled, to give 50 g of low-hydration alumina. Deoxygenated cyclohexane (600 ml) was passed through a bed of Woelm acid alumina into an enclosed blender equipped with a high-speed stirrer. There were then added to the blender 4 mmol of triisobutylaluminum, 2 ml of a solution of 0.1 mmol of tetrabenzylzirconium in toluene, and the 50 g of low-hydration alumina described above. The mixture was stirred vigorously, and the resulting dispersion was transferred through polyethylene tubing under nitrogen pressure to a 1-liter stainless-steel autoclave equipped with a stirrer. The autoclave had previously been dried at 150° C/0.5 mm and purged with nitrogen for 3 hours at 150° C.

Stirring was started, the mixture was heated to 50° C, ethylene was admitted to a total pressure of 100 psi, and the system was maintained at 50° C and 100 psi, with repressuring as necessary, until the ethylene supply cylinder showed a weight loss of about 50 g in addition to the ethylene used for the initial pressuring (2 hr 48 min). The ethylene supply was shut off, the autoclave was cooled and bled to atmospheric pressure, and the solid was isolated by filtration and dried.

The product was 94 g of a powdery polyethylene/low-hydration alumina composite that passed through a 28-mesh screen. It gave 41.96% ash on combustion, corresponding to an $Al_2O_3$ content of about 42%. A hot-pressed film was uniform and tough. Test bars made by hot-compression molding had the following properties.

Tensile (T): 4977, 4905 psi
Elongation ($E_b$): 165%, 152%
Modulus ($M_i$): 246, 323 kpsi
0° F Izod impact: 10.5, 9.2 ft lb/in of notch (hinge break)

EXAMPLES 2–9

(A) A number of other runs were carried out by essentially the method of Example 1 using Great Lakes "GHA" 431 alumina trihydrate (weight-average equivalent spherical particle diameter 3.5 $\mu$) as the source of low-hydration alumina in place of "GHA" 332. In each run, as in Example 1, the medium was 600 ml of cyclohexane, the catalyst system was tetrabenzylzirconium/triisobutylaluminum (TBZ/TIBA), and the polymerization was conducted at about 50° C and 100 psi. Data for these examples are summarized in Table I. Examples 2–7 show that the properties of products having approximately the same ash content (50% ± 5%) do not vary significantly for calcination temperatures from 300° to 900° C. Examples 8 and 9 illustrate products of the invention containing somewhat higher proportions of alumina.

For comparison, an experiment not within the scope of the invention (control) was carried out by calcining at 235° C.

TABLE I

| Ex | Calcination Temp °C | Time hr | g Low-hydration alumina | Mmol TBZ | Mmol TIBA | g Ethylene | Polymn time hr:min | g Product | % Ash | Inh. Visc. | Tensile psi | Elongn % | Modulus kpsi | °F Izod impact ft lb/in notch | 264-psi Heat deflect °C |
|---|---|---|---|---|---|---|---|---|---|---|---|---|---|---|---|
| 2 | 300 | 18 | 50 | 0.2 | 6 | 40 | 0:20 | 105 | 54.03 | 23.74 | 6046 | 178 | 939 | 6.9 | 66 |
|   |   |   |   |   |   |   |   |   |   |   | 6251 | 219 | 849 | 6.8 | 67 |
| 3 | 400 | " | " | " | 4 | 50 | 0:18 | 102 | 48.74 |   | 5466 | 127 | 494 | 6.7 | — |
|   |   |   |   |   |   |   |   |   |   |   | 5662 | 141 | 497 | 6.5 | — |
| 4 | 500 | " | " | " | " | " | 0:47 | 104 | 46.36 |   | 5963 | 169 | 402 | 7.7 | — |
|   |   |   |   |   |   |   |   |   |   |   | 6002 | 170 | 415 | 7.6 | — |

TABLE I-continued

| Ex | Calcination Temp °C | Time hr | g Low-hydration alumina | Mmol TBZ | Mmol TIBA | g Ethylene | Polymn time hr:min | g Product | % Ash | Inh. Visc. | Tensile psi | Elongn % | Modulus kpsi | 0° F Izod impact ft lb/in notch | 264-psi Heat deflect °C |
|---|---|---|---|---|---|---|---|---|---|---|---|---|---|---|---|
| 5 | 700 | " | " | " | " | " | 0:20 | 117 | 45.00 | | 6731 | 174 | 354 | 7.5 | 55 |
|   |     |   |   |   |   |   |      |     |       | | 6665 | 157 | 369 | 7.4 | 54.5 |
| 6 | 800 | 0.5 | 60 | 0.3 | 6 | 43 | 0:20 | 94 | 49.17 | 15.70 | 6228 | 149 | 505 | 6.3 | — |
|   |     |     |    |     |   |    |      |    |       |       | 6068 | 132 | 643 | 6.5 | — |
| 7 | 900 | 30 | " | " | " | " | 0:08 | 103 | 51.49 | 13.75 | 6427 | 175 | 519 | 6.0 | — |
|   |     |    |   |   |   |   |      |     |       |       | 6167 | 117 | 562 | 5.9 | — |
| 8 | 500 | 18 | 65 | 0.2 | " | 40 | 0:14 | 110 | 57.09 | 11.72 | 6092 | 102 | 743 | 5.1 | 81 |
|   |     |    |    |     |   |    |      |     |       |       | 6486 | 133 | 734 | 4.9 | 76 |
| 9 | "   | "  | 70 | 0.3 | " | 25 | 0:12 | 96 | 65.03 | 17.41 | 5065 | 55 | 831 | 4.4 | — |
|   |     |    |    |     |   |    |      |     |       |       | 5405 | 61 | 943 | 4.0 | — |
| Control | | | 235 | | | | | | | | 3500 | | | | |

(B) Following the general procedure of Part (A) above using alumina trihydrates "GHA" 331 and "GHA" 432 in place of "GHA" 431, polyethylene/low-hydration alumina composites with properties like those of the products of Examples 2–9 were obtained.

EXAMPLE 10

"Alcoa" C-30BF alumina trihydrate having a screen analysis of 1–3% on 200 mesh, 15–20% on 325 mesh, and 80–85% through 325 mesh was calcined at 500° C to form a low-hydration alumina. A composite containing about 45.9% $Al_2O_3$ prepared in the manner of Example 4 had tensile strengths of 4561 and 4328 psi.

EXAMPLE 11

A composite containing about 53.3% $Al_2O_3$ and made in a manner similar to Example 4 from "Alcoa" C330 alumina trihydrate calcined at 500° C had tensile strengths of 3902 and 4295 psi.

EXAMPLE 12

This example shows that an alkylaluminum compound need not be included in the catalyst system.

Example 1 was essentially repeated, except that 0.5 mmol of tetrabenzylzirconium and no triisobutylaluminum were used. The polymerization required 52 minutes. The product was 99 g of a solid that pased through a 28-mesh screen. It gave 53.31% ash on combustion, corresponding to an $Al_2O_3$ content of about 53.3%. Hot-compression-molded test bars had the following properties:
Tensile (T): 6402, 6231 psi
Elongation ($E_b$): 152%, 125%
Modulus ($M_i$): 779, 685 kpsi
0° F Izod impact: 5.1, 5.2 ft lb/in of notch (hinge break)
264-psi Heat Deflection: 74.5° C, 83.5° C

EXAMPLE 13

This example shows that a relatively very short calcination time at 600° C gives a low-hydration alumina satisfactory for use in the process.

Under a stream of nitrogen at 30 liters/hr, Great Lakes "GHA" 431 alumina trihydrate (Example 2) was heated to 600° C (40 minutes required), held at 600° C for 10 minutes, and allowed to cool to room temperature. The low-hydration alumina thus produced gave 95.25% ash on ignition, corresponding to the composition $Al_2O_3 \cdot 0.29H_2O$.

By essentially the method of Example 1, a dispersion was made up by combining, in the stated order, 600 ml of cyclohexane, 6 mmol of triisobutylaluminum, 50 g of the low-hydration alumina described above, and 0.2 mmol of tetrabenzylzirconium. It was processed with ethylene at 50° C and 100 psi until the supply cylinder had lost about 40 g of ethylene (25 min). The product was 100 g of an extremely fine powder that gave 53.12% ash on combustion, corresponding to an $Al_2O_3$ content of about 53.1%. The inherent viscosity of the polymer was 20.39. A film was formed by pressing at 180° C and was strong, uniform, and not brittle. Hot-compression-molded test bars had the following properties.
Tensile (T): 5228, 6371 psi
Elongation ($E_b$): 101%, 154%
Modulus ($M_i$): 445, 440 kpsi
0° F Izod impact: 5.4, 4.7 ft lb/in of notch (hinge break)

EXAMPLE 14

This example illustrates the use of tetraneophylzirconium as the transition metal component of the catalyst system.

By essentially the method of Example 1, a dispersion was made up by combining in the stated order 600 ml of cyclohexane, 6 mmol of triisobutylaluminum, 0.3 mmol of tetraneophylzirconium, and 60 g of low-hydration alumina made by calcining "GHA" 431 alumina trihydrate (Example 2) at 500° C. The dispersion was processed with ethylene at 50° C and 82–99 psi until the supply cylinder had lost about 40 g of ethylene (15 min).

The product was 108 g of a powder that passed through a 16-mesh screen. It gave 51.18% ash on combustion, correspondng to an $Al_2O_3$ content of about 51.2%. The inherent viscosity of the polymer was 17.67. Hot-compression-molded test bars had the following properties:
Tensile (T): 5767, 5671 psi
Elongation ($E_b$): 107%, 107%
Modulus ($M_i$): 538, 619 kpsi
0° F Izod impact: 5.1, 5.1 ft lb/in of notch (partial break)

EXAMPLE 15

This example illustrates the use of a "titania" coating as the transition metal component of the catalyst system.

(A) A 400-g portion of "GHA" 431 alumina trihydrate (Example 2) was heated at 500° C for 18 hours and cooled. A portion (125 g) of the low-hydration alumina thus produced was suspended in 500 ml of dry, deoxygenated cyclohexane, to give a viscous mixture. Tetraisopropyl titanate (30 ml) was added with stirring, whereupon the mixture became much more fluid. After occasional stirring, the mixture was allowed to stand for 1 day and pressure-filtered under nitrogen. The solid on the filter was washed with cyclohexane and air-dried. The titanated low-hydration alumina thus produced contained 1.06% Ti. A portion (60 g) of this material was heated at 400° C for 18 hours in a stream of nitrogen at 30 liters/hr and cooled under nitrogen.

(B) By essentially the method of Example 1, a dispersion consisting of 600 ml of cyclohexane, the 60 g of titanated low-hydration alumina of part (A), and 6 mmol of triisobutylaluminum was processed with ethylene at 50° C and 100 psi until the supply cylinder had lost about 40 g of ethylene (41 min). The product was 100 g of a powder that passed through a 16-mesh screen. It gave 54.05% ash on combustion, corresponding to an $Al_2O_3$ content of about 54%. The inherent viscosity of the polymer was 22.52. A tough film was formed by pressing at 180° C. Hot-compression-molded bars had the following properties:
Tensile (T): 5206, 5024 psi
Elongation ($E_b$): 49%, 46%
Modulus ($M_i$): 640, 666 kpsi
0° F Izod impact: 4.2, 3.7 ft lb/in of notch (partial break)

EXAMPLE 16

This example illustrates the use of tetraisopropyl titanate as the transition metal component of the catalyst system.

By essentially the method of Example 1, a dispersion was made up by combining in the stated order 600 ml of cyclohexane, 8 mmol of triisobutylaluminum, 0.3 mmol of tetraisopropyl titanate, and 60 g of low-hydration alumina made by calcining "GHA" 431 alumina trihydrate (Example 2) at 500° C. The dispersion was processed with ethylene at 50° C and 100 psi until the supply cylinder had lost about 40 g of ethylene (3 hr, 19 min). The product was 83 g of a powder that passed through a 16-mesh screen, plus 23 g of larger particles, which were discarded. It gave 53.87% ash on combustion, corresponding to an $Al_2O_3$ content of about 53.9%. Hot-compression-molded test bars had the following properties:
Tensile (T): 5725, 5689 psi
Elongation ($E_b$): 95%, 89%
Modulus ($M_i$): 676, 715 kpsi
0° F Izod impact: 4.5, 4.4 ft lb/in of notch (hinge break)

I claim:

1. A solid, particulate, polyethylene/low-hydration alumina composite which comprises
   (a) 10–70% by weight of polyethylene having an inherent viscosity of at least 2, and
   (b) 30–90% by weight of finely-divided, low-hydration alumina prepared by calcining alumina trihydrate having a weight-average equivalent spherical particle diameter of 0.1 to less than 50 $\mu$ at a temperature of at least 300° C for a time sufficient that the degree of hydration is reduced to not more than 0.8 $H_2O$, said low-hydration alumina having interacted at its surface a catalytically-effective amount of catalytically-active, transition metal compound, said polyethylene being polymerized onto the surface of said low-hydration alumina.

2. The composite of claim 1 which is homogeneous and, in unoriented, compression molded form, has a tensile strength of at least 4500 psi.

3. The composite of claim 2 which contains 15–60% polyethylene having an inherent viscosity of at least 8 and 40–85% low-hydration alumina having a weight-average equivalent spherical particle diameter of 0.5–10 $\mu$, and 0.00001–2.2 milligram-atom of transition metal, per gram of low-hydration alumina, interacted at its surface.

4. The composite of claim 3 which contains 20–55% polyethylene having an inherent viscosity of at least 12, and 45–80% low-hydration alumina, and in which the transition metal is selected from the group consisting of titanium and zirconium.

5. The method of preparing a solid, particulate, polyethylene/low-hydration alumina composite which comprises
   (A) calcining alumina trihydrate having a weight-average equivalent spherical particle diameter of 0.1 to less than 50 $\mu$ by heating at a temperature of at least 300° C for a time sufficient that the degree of hydration is reduced to not more than 0.8 $H_2O$, thereby forming finely-divided, low-hydration alumina;
   (B) polymerizing ethylene onto the surface of the low-hydration alumina having interacted at its surface a catalytically-effective amount of catalytically-active, transition metal compound until a composite containing 10–70% by weight of polyethylene having an inherent viscosity of at least 2 is formed; and
   (C) isolating the resulting polyethylene/low-hydration alumina composite as a free-flowing powder.

6. The method of preparing a solid, homogeneous, particulate, polyethylene/low-hydration alumina composite which comprises
   (A) calcining alumina trihydrate which has a weight-average equivalent spherical particle diameter of 0.1 to less than 50 $\mu$ by heating at a temperature of at least 300° C for a time sufficient that the degree of hydration is reduced to not more than 0.8 $H_2O$, thereby forming finely-divided, low-hydration alumina,
   (B) contacting the low-hydration alumina with sufficient hydrolyzable titanium compound to provide a catalytically effective amount of titanium interacted at the surface of the low-hydration alumina;
   (C) removing unadsorbed titanium compound from the titanium-treated, low-hydration alumina;
   (D) hydrolyzing the adsorbed titanium compound;
   (E) activating the titanium-treated, low-hydration alumina by heating at a temperature of at least 300° C to form a titania-modified, low-hydration alumina;
   (F) dispersing
      (1) the titania-modified, low-hydration alumina, and
      (2) a catalytically-effective amount of catalytically-active, organoaluminum compound in an inert, liquid hydrocarbon diluent;
   (G) contacting the resulting dispersion with ethylene with agitation at a temperature of 0°–250° C and a pressure from atmospheric to 500 atmospheres until a composite containing 10–70% by weight of polyethylene having an inherent viscosity of at least 2 is formed; and
   (H) isolating the resulting polyethylene/low-hydration alumina composite as a free-flowing powder.

7. The method of claim 6 in which the alumina trihydrate has a weight-average equivalent spherical particle diameter of 0.5–10 $\mu$, the low hydration alumina has 0.00001–2.2 milligram-atom, per gram of low-hydration alunina, of titanium interacted at its surface, and the dispersion contains organoaluminum compound selected from the group consisting of trialkylaluminums, dialkylaluminum hydrides, dialkylaluminum alkoxides and alkylaluminum halides in an amount which provides a mole ratio of organoaluminum compound to transition metal compound of 1000:1 to 4:1.

8. The method of preparing a solid, homogeneous, particulate, polyethylene/low-hydration alumina composite which comprises
- (A) calcining alumina trihydrate which has a weight-average equivalent spherical particle diameter of 0.1 to less than 50 μ by heating at a temperature of at least about 300° C for a time sufficient that the the degree of hydration is reduced to not more than 0.8 H$_2$O, thereby forming finely-divided, low-hydration alumina;
- (B) dispersing
    - (1) the low-hydrating alumina, and
    - (2) a catalytically-effective amount of catalytically-active, organoaluminum compound in an inert, liquid hydrocarbon diluent;
- (C) adding to the resulting dispersion a catalytically-effective amount of catalytically-active, hydrocarbon-soluble, organic, transition metal compound which is at least 50 times more active when adsorbed onto the surface of the low-hydration alumina than in solution;
- (D) contacting the resulting dispersion with ethylene with agitation at a temperature of 0°-100° C and a pressure from atmospheric to 500 atmospheres until a composite containing 10-70% by weight of polyethylene having an inherent viscosity of at least 2 is formed; and
- (E) isolating the resulting polyethylene/low-hydration alumina composite as a free-flowing powder.

9. The method of claim 8 in which the organoaluminum compound is selected from the group consisting of trialkylaluminums, dialkylaluminum hydrides, dialkylaluminum alkoxides and alkylaluminum halides and the transition metal compound is a tetraorganozirconium compound, the organoaluminum compound is present in an amount which provides a mole ratio of organoaluminum compound to tetraorganozirconium compound of 1000:1 to 4:1 and the tetraorganozirconium compound is present in an amount which provides 0.0001 to 1.0 milligram-atom of zirconium per gram of low-hydration alumina, and the tetraorganozirconium compound reacts with the organoaluminum compound on the surface of the alumina.

10. The method of claim 9 in which the dispersion is contacted with ethylene until a composite containing 15-60% by weight of polyethylene having an inherent viscosity of at least 8 is formed.

11. The method of claim 10 in which the low-hydration alumina has a weight-average equivalent spherical particle diameter of 0.5-10 μ, the dispersion contains 0.001 to 0.1 milligram-atom of zirconium per gram of alumina, the mole ratio of organoaluminum compound to tetraorganozirconium compound is 40:1 to 10:1, and the dispersion is contacted with ethylene until 20-55% by weight of polyethylene having an inherent viscosity of at least 12 is formed.

12. The method of preparing a solid, homogeneous, particulate, polyethylene/low-hydration alumina composite which comprises
- (A) reacting catalytically-active, organoaluminum compound with sufficient catalytically-active, hydrocarbon-soluble, organic, transition metal compound to provide a mole ratio of organoaluminum compound to transition metal compound of 1000:1 to 4:1, thereby forming an organoaluminum compound/-transition metal compound complex;
- (B) calcining alumina trihydrate which has a weight-average equivalent spherical particle diameter of 0.1 to less than 50 μ by heating at a temperature of at least about 300° C for a time sufficient that the degree of hydration is reduced to not more than 0.8 H$_2$O, thereby forming finely-divided, low-hydration alumina;
- (C) dispersing
    - (1) the low-hydration alumina, and
    - (2) a catalytically-effective amount of the organoaluminum compound/transition metal compound complex in an inert, liquid hydrocarbon diluent;
- (D) contacting the resulting dispersion with ethylene with agitation at a temperature of 0°-100° C and a pressure from atmospheric to 500 atmospheres until a composite containing 10-70% by weight of polyethylene having an inherent viscosity of at least 2 is formed; and
- (E) isolating the resulting polyethylene/low-hydration alumina composite as a free-flowing powder.

13. The method of claim 12 in which the organoaluminum compound is selected from the group consisting of trialkylaluminums, dialkylaluminum hydrides, dialkylaluminum alkoxides and alkylaluminum halides, the organic transition metal compound is a tetraorganozirconium compound, the organoaluminum compound/tetraorganozirconium compound complex is present in an amount which provides 0.0001-1.0 milligram-atom of zirconium, per gram of low-hydration alumina, and the polymerization is carried out until a composite containing 15-60% by weight of polyethylene having an inherent viscosity of at least 8 is formed.

14. The method of claim 13 in which the dispersion is contacted with ethylene until a composite containing 20-55% by weight of polyethylene having an inherent viscosity of at least 12 is formed.

15. The method of claim 14 in which the alumina has a weight-average equivalent spherical particle diameter of 0.5 to 10 μ, the mole ratio of organoaluminum compound to tetraorganozirconium compound is 40:1 to 10:1 and the organoaluminum compound/tetraorganozirconium compound complex is present in an amount which provides 0.001 to 0.1 milligram atom of zirconium per gram of low-hydration alumina.

* * * * *